(12) United States Patent
Liu et al.

(10) Patent No.: US 11,014,178 B2
(45) Date of Patent: May 25, 2021

(54) ELECTRICAL MACHINING DEVICE AND METHOD, HYBRID MACHINING SYSTEM AND METHOD

(71) Applicant: General Electric Company, Schenectady, NY (US)

(72) Inventors: Dong Liu, Shanghai (CN); Andrew Lee Trimmer, Niskayuna, NY (US); Yuanfeng Luo, Niskayuna, NY (US); Steven Robert Hayashi, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 763 days.

(21) Appl. No.: 15/658,855

(22) Filed: Jul. 25, 2017

(65) Prior Publication Data
US 2018/0065200 A1 Mar. 8, 2018

(30) Foreign Application Priority Data
Sep. 5, 2016 (CN) .................. 201610802471.3

(51) Int. Cl.
*B23H 1/04* (2006.01)
*B23H 7/30* (2006.01)
(Continued)

(52) U.S. Cl.
CPC .............. *B23H 1/04* (2013.01); *B23H 1/024* (2013.01); *B23H 1/026* (2013.01); *B23H 7/26* (2013.01); *B23H 7/30* (2013.01); *B23Q 5/28* (2013.01); *B65H 35/00* (2013.01); *B23H 5/04* (2013.01); *B23H 7/18* (2013.01); *B23H 2500/00* (2013.01); *G05B 2219/41029* (2013.01); *G05B 2219/45221* (2013.01)

(58) Field of Classification Search
USPC ............ 219/69.17, 69.16, 29.13, 69.11, 69.1
See application file for complete search history.

(56) References Cited

U.S. PATENT DOCUMENTS

| 4,152,569 A | 5/1979 | Bell, Jr. et al. |
| 4,322,595 A | 3/1982 | Fowell et al. |
(Continued)

FOREIGN PATENT DOCUMENTS

CN 103624684 A 3/2014

OTHER PUBLICATIONS

K H Ho et al., "State of the art electrical discharge machining (EDM)", International Journal of Machine Tools and Manufacture, vol. 43, Issue: 13, pp. 1287-1300, Oct. 2003.
(Continued)

*Primary Examiner* — Ibrahime A Abraham
*Assistant Examiner* — Elizabeth M Sims
(74) *Attorney, Agent, or Firm* — Dority & Manning, P.A.

(57) ABSTRACT

An electrical machining method comprises machining a workpiece by an electrical machining device comprising an electrode; increasing a feedrate of the electrode at a first acceleration if a discharge current passing through the electrode and the workpiece is lower than a discharge current reference; and decreasing the feedrate of the electrode at a second acceleration if the discharge current is higher than the discharge current reference, wherein the second acceleration has an absolute value higher than that of the first acceleration.

20 Claims, 5 Drawing Sheets

(51) Int. Cl.
*B23H 1/02* (2006.01)
*B23H 7/26* (2006.01)
*B23Q 5/28* (2006.01)
*B23H 5/04* (2006.01)
*B65H 35/00* (2006.01)
*B23H 7/18* (2006.01)

(56) References Cited

U.S. PATENT DOCUMENTS

| | | | |
|---|---|---|---|
| 4,510,364 A | 4/1985 | Ito | |
| 4,667,079 A | 5/1987 | Matsumura et al. | |
| 4,864,091 A | 9/1989 | Boccadoro | |
| 5,360,957 A | 11/1994 | Haefner et al. | |
| 6,225,589 B1 | 5/2001 | Bartok | |
| 6,303,890 B1* | 10/2001 | Scuderi | B23H 7/18 |
| | | | 219/69.16 |
| 8,369,980 B2 | 2/2013 | Buhler et al. | |
| 8,560,110 B2 | 10/2013 | Zhan et al. | |
| 8,911,599 B2 | 12/2014 | Li et al. | |
| 2003/0098293 A1* | 5/2003 | Sato | B23H 7/065 |
| | | | 219/69.12 |
| 2007/0034609 A1* | 2/2007 | Murai | B23H 7/16 |
| | | | 219/69.16 |
| 2007/0228017 A1* | 10/2007 | Wei | B23H 1/00 |
| | | | 219/69.14 |
| 2011/0243677 A1* | 10/2011 | Janssen | B23P 23/04 |
| | | | 409/64 |
| 2013/0062318 A1 | 3/2013 | Ebashi et al. | |
| 2015/0360310 A1* | 12/2015 | Tee | B23H 1/022 |
| | | | 219/69.16 |

OTHER PUBLICATIONS

Azli Yahya, "Digital control of an electro discharge machining (EDM) system", Loughborough University Institutional Repository, 2005.

Extended European Search Report and Opinion issued in connection with corresponding EP Application No. 17189331.6 dated Feb. 20, 2018.

European Office Action Corresponding to Application No. 17189331 dated Sep. 15, 2020.

\* cited by examiner

ELECTRICAL MACHINING DEVICE AND METHOD, HYBRID MACHINING SYSTEM AND METHOD

BACKGROUND

Embodiments of the present disclosure relate generally to electrical machining devices and methods, and hybrid machining systems and methods.

Electrical machining is a manufacturing process whereby a desired shape is obtained using electrical discharges. Material is removed from the workpiece by a series of rapidly recurring current discharges between the electrode and the workpiece. Conventional electrical machining methods have problems of low efficiency and stability.

A conventional machining process combination usually requires two or more independent machining devices in sequence, each of which requires particular hardware and software resources, thus causing a high complexity for system design and a time-consuming process for tool assembling and disassembly.

Therefore, it is desirable to provide new electrical machining devices and methods, and hybrid machining systems and methods to solve at least one of the above-mentioned problems.

BRIEF DESCRIPTION

In one aspect, an electrical machining method comprises machining a workpiece by an electrical machining device comprising an electrode; increasing a feedrate of the electrode at a first acceleration if a discharge current passing through the electrode and the workpiece is lower than a discharge current reference; and decreasing the feedrate of the electrode at a second acceleration if the discharge current is higher than the discharge current reference, wherein the second acceleration has an absolute value higher than that of the first acceleration.

In another aspect, an electrical machining device comprises an electrode for machining a workpiece and an feedrate regulator. The feedrate regulator is configured to increase a feedrate of the electrode at a first acceleration if a discharge current passing through the electrode and the workpiece is lower than a discharge current reference, and decrease the feedrate of the electrode at a second acceleration if the discharge current is higher than the discharge current reference; wherein the second acceleration has an absolute value higher than that of the first acceleration.

In another aspect, a hybrid machining system comprises a cutter for machining a workpiece in a first mode, an electrode for machining the workpiece in a second mode, and a hybrid controller. The hybrid controller is configured to control the cutter to machine the workpiece in the first mode. The hybrid controller is also configured to increase a feedrate of the electrode at a first acceleration in the second mode if a discharge current passing through the electrode and the workpiece is lower than a discharge current reference, and decrease the feedrate of the electrode at a second acceleration in the second mode if the discharge current is higher than the discharge current reference, wherein the second acceleration has an absolute value higher than that of the first acceleration.

In another aspect, a machining method using a hybrid machining system comprises operating the system in a first mode and operating the system in a second mode, wherein the hybrid machining system comprises a cutter, an electrode and a toolholder. The operating the system in the first mode comprises holding the cutter with the toolholder; and machining a workpiece with the cutter. The operating the system in the second mode comprises holding the electrode with the toolholder; machining the workpiece with the electrode; increasing a feedrate of the electrode at a first acceleration if a discharge current passing through the electrode and the workpiece is lower than a discharge current reference; and decreasing the feedrate of the electrode at a second acceleration if the discharge current is higher than the discharge current reference; wherein the second acceleration has an absolute value higher than that of the first acceleration.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

In an effort to provide a concise description of these embodiments, not all features of an actual implementation are described in one or more specific embodiments. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of the present disclosure.

Unless defined otherwise, technical and scientific terms used herein have the same meaning as is commonly understood by one of ordinary skill in the art to which the present disclosure belongs. The terms "first," "second," "third," "fourth," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either any, several, or all of the listed items. The use of "including," "comprising," or "having," and variations thereof herein are meant to encompass the items listed thereafter and equivalents thereof as well as additional items.

In one aspect, embodiments of the present disclosure refer to an electrical machining device which can be widely applied in parts machining. In some embodiments, the electrical machining device is a High Speed Electro Erosion (HSEE) device which performs a HSEE process. The HSEE process, for example, BlueArc™, can be applied to rough cut high strength alloys.

Figure 1:
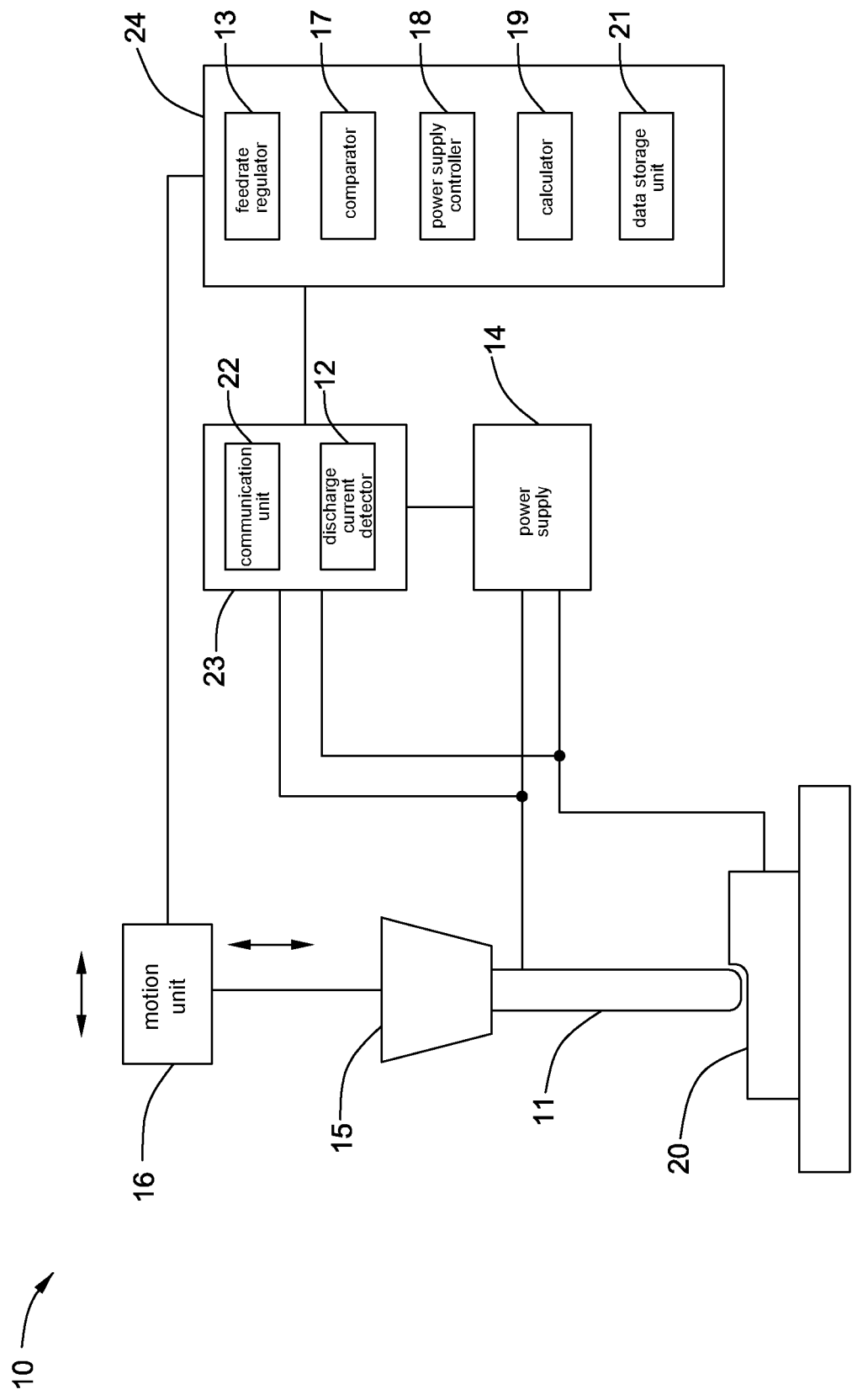
FIG. 1 is a sketch view illustrating an electrical machining device in accordance with an exemplary embodiment of the present disclosure.

FIG. 1 shows a sketch view of an electrical machining device 10 for machining a workpiece 20, in accordance with an exemplary embodiment of the present disclosure.

Referring to FIG. 1, the electrical machining device 10 comprises an electrode 11 and a feedrate regulator 13. The electrode 11 is configured to machine the workpiece 20 at a feedrate. The feedrate regulator 13 is configured to increase the feedrate of the electrode 11 at a first acceleration if a discharge current passing through the electrode and the workpiece is lower than a discharge current reference. The feedrate regulator 13 is configured to decrease the feedrate of the electrode at a second acceleration if the discharge current is higher than the discharge current reference. The second acceleration has an absolute value higher than that of the first acceleration. The first or second acceleration used herein may be an average acceleration. The "absolute value" used herein refers to a non-negative value of a number without regard to its sign.

The electrical machining device 10 further comprises a power supply 14 which is coupled with the electrode 11 and the workpiece 20 for energizing one of the workpiece and the electrode as an anode and the other as a cathode, in order to produce discharges between the electrode 11 and the workpiece 20 when the electrode 11 is positioned adjacent to the workpiece 20. The discharge current passing through the electrode 11 and the workpiece 20 is generated in this case, and the discharge current varies during the machining process. In some embodiments, the power supply 14 comprises a constant voltage source for outputting a preset voltage which remains roughly unchanged during the machining process.

The electrical machining device 10 further comprises a discharge current detector 12 and a comparator 17. The discharge current detector 12 is coupled with the electrode 11 and the workpiece 20 for detecting the discharge current to obtain a real time discharge current. The comparator 17 is configured to compare the detected real time discharge current with the discharge current reference to obtain a compared result. The feedrate regulator 13 increases or decreases the feedrate of the electrode according to the compared result. The discharge current reference can be predetermined based on an operating condition of the electrical machining device. For example, the discharge current reference may be predetermined based on a maximum of the discharge current, a minimum of the discharge current, an override ratio reference or a combination thereof. In some embodiments, the discharge current reference is set to 2500 A.

The electrical machining device 10 further comprises a toolholder 15 and a motion unit 16. The electrode 11 is held by the toolholder 15. The motion unit 16 is coupled with at least one of the toolholder 15 and the workpiece 20 for positioning the toolholder 15 as well as the electrode 11 relative to the workpiece 20. In the embodiment illustrated in FIG. 1, the motion unit 16 is coupled with the toolholder 15 to move the toolholder 15 and the electrode 11 relative to the workpiece 20. In some other embodiments the motion unit 16 may be coupled with the workpiece to move the workpiece relative to the electrode.

When the electrical machining device 10 is working, the power supply 14 is switched on to energize the electrode 11 and the workpiece 20. The motion unit 16 drives the electrode 11 to advance towards the workpiece 20 at an initial feedrate. A discharge current passing through the electrode 11 and the workpiece 20 can be generated when the electrode 11 is adjacent to the workpiece 20. The discharge current is regarded as a load condition indicator during the machining process, so the feedrate can be adjusted based on the real time discharge current.

The feedrate regulator 13 is coupled with the motion unit 16 for adjusting the feedrate of the electrode 11 according to the compared result. Specifically, the feedrate regulator 13 increases or decreases the feedrate by controlling the motion unit 16. If the real time discharge current is lower than the discharge current reference, the feedrate regulator 13 increases the feedrate of the electrode 11 at the first acceleration, in order to improve a machining efficiency. If the real time discharge current is higher than the discharge current reference, the feedrate regulator 13 decreases the feedrate of the electrode 11 at the second acceleration, in order to achieve better stability of machining process. As mentioned before, the second acceleration has an absolute value higher than that of the first acceleration, which indicates that the feedrate of the electrode increases more slowly than it decreases, in such a manner that the stability of the machining process can be further improved and statuses of over-speed or over-current can be avoided.

In some embodiments, the feedrate regulator 13 increases the feedrate by multiplying the feedrate by a first override ratio higher than an override ratio reference, and decreases the feedrate by multiplying the feedrate by a second override ratio lower than the override ratio reference. The override ratio reference can be predetermined based on the operating condition of the electrical machining device. In some embodiments, the override ratio reference may be predetermined based on a maximum of the override ratio, a minimum of the override ratio, a discharge current reference or a combination thereof. For example, the override ratio reference may be set to 100%. Thus, the first override ratio is higher than 100%, and the second override ratio is lower than 100%.

More specifically, the feedrate regulator 13 increases the feedrate by adjusting the feedrate to a first target feedrate value which is calculated by: $F_{t1}=F_r*R_1$, and decreases the feedrate by adjusting the feedrate to a second target feedrate value which is calculated by: $F_{t2}=F_r*R_2$, wherein $F_{t1}$ represents the first target feedrate, $F_{t2}$ represents the second target feedrate, $F_r$ represents a real time feedrate, $R_1$ represents the first override ratio, and $R_2$ represents the second override ratio.

In some embodiments, the electrical machining device 10 comprises a calculator 19 for calculating the first override ratio by:

$$R_1 = \frac{R_{max} - R_{ref}}{I_{min} - I_{ref}}(I_r - I_{min}) + R_{max},$$

and calculating the second override ratio by $$R_2 = \frac{R_{min} - R_{ref}}{I_{max} - I_{ref}}(I_r - I_{max}) + R_{min},$$

wherein $I_r$ represents a real time discharge current, $I_{ref}$ represents the discharge current reference, $I_{min}$ represents the minimum of the discharge current, $I_{max}$ represents the maximum of the discharge current, $R_{ref}$ represents the override ratio reference, $R_{min}$ represents the minimum of the override ratio, and $R_{max}$ represents the maximum of the override ratio.

$$\frac{R_{max} - R_{ref}}{I_{min} - I_{ref}}$$

relates to the first acceleration, $$\frac{R_{min} - R_{ref}}{I_{max} - I_{ref}}$$

relates to the second acceleration, and $$\left|\frac{R_{max} - R_{ref}}{I_{min} - I_{ref}}\right| < \left|\frac{R_{min} - R_{ref}}{I_{max} - I_{ref}}\right|.$$

The minimum of the discharge current $I_{min}$, the maximum of the discharge current $I_{max}$, the minimum of the override ratio $R_{min}$ and the maximum of the override ratio $R_{max}$ can be predetermined based on the operating condition of the electrical machining device.

Figure 3:
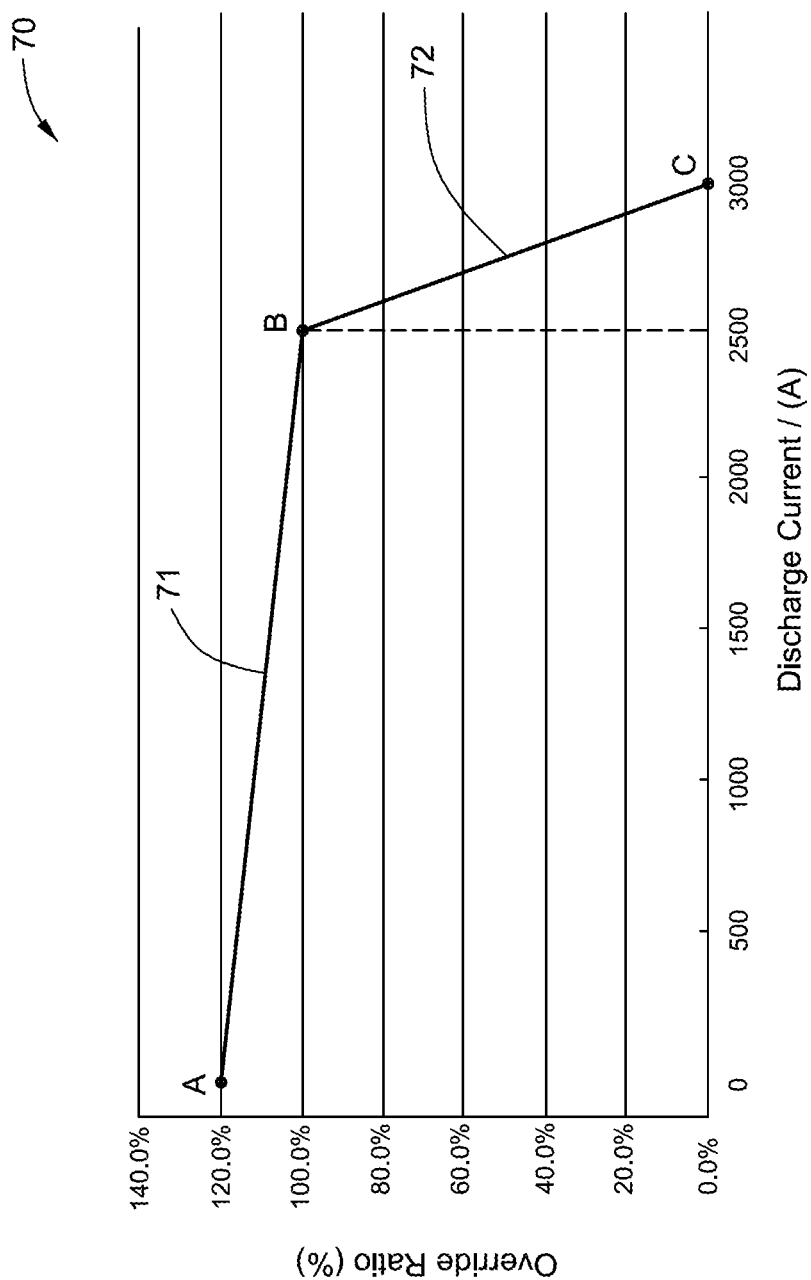
FIG. 3 is a graph illustrating a relation between an override ratio of a feedrate of and a discharge current of the electrical machining device in accordance with an exemplary embodiment of the present disclosure.

In general, relations between the override ratio of the feedrate and the real time discharge current can be illustrated as a broken line 70 shown in FIG. 3. The broken line 70 comprises a first segment 71 and a second segment 72. The first segment 71 is a straight line defined between a first point A and a second point B, which illustrates the relation between the first override ratio and the discharge current. The second segment 72 is a straight line defined between the second point B and a third point C, which illustrates the relation between the second override ratio and the discharge current. The first point A indicates a status in which the real time discharge current equals the minimum of discharge current $I_{min}$, and the override ratio equals the maximum of the override ratio $R_{max}$. The second point B indicates a status in which the real time discharge current equals the discharge current reference $I_{ref}$, and the override ratio equals the override ratio reference $R_{ref}$. The third point C indicates a status in which the real time discharge current equals the maximum of discharge current $I_{max}$, and the override ratio equals the minimum of the override ratio $R_{min}$. As shown in FIG. 3, the first and second segments have different slopes. The first segment 71 has a first slope equal to $$\frac{R_{max} - R_{ref}}{I_{min} - I_{ref}},$$

and me second segment 72 has a second slope equal to $$\frac{R_{min} - R_{ref}}{I_{max} - I_{ref}}.$$

As mentioned above, the first slope $$\left(\frac{R_{max} - R_{ref}}{I_{min} - I_{ref}}\right)$$

has an absolute value lower than that of the second slope $$\left(\frac{R_{min} - R_{ref}}{I_{max} - I_{ref}}\right).$$

In the embodiment shown in FIG. 3, $I_{ref}$ is set to 2500 A, $R_{ref}$ is set to 100%, $I_{min}$ is set to 0, $I_{max}$ is set to 3000 A, $R_{min}$ is set to 0% and $R_{max}$ is set to 120%.

In some other embodiments, the broken line may comprise three or more segments which have different slopes, in such a manner that a performance of the device can be further improved.

In some embodiments, the electrical machining device 10 further comprises a power supply controller 18 for switching on or off the power supply 14. The electrical machining device 10 may further comprise a data storage unit 21 for storing at least one of the real time discharge current, the first override ratio, the second override ratio, the target feedrate, the discharge current reference, the override ratio reference, the minimum and maximum of the discharge current, and the minimum and maximum of the override ratio. The electrical machining device 10 may further comprise a communication unit 22 for communicating signals among the discharge current detector 12, the comparator 17, the feedrate regulator 13, the power supply 14, the power supply controller 18, the calculator 19, and the data storage unit 21.

The feedrate regulator 13, the comparator 17, the discharge current detector 12, the power supply controller 18, the calculator 19, the data storage unit 21 and the communication unit 22 may be configured independently from each other. Or, at least some of them may be integrated. For example, as shown in FIG. 1, the discharge current detector 12 and the communication unit 22 are integrated as an interface circuit 23, while the feedrate regulator 13, the comparator 17, the power supply controller 18, the calculator 19, and the data storage unit 21 are integrated as an electrical machining controller 24.

Embodiments of the present disclosure also refer to a hybrid machining system which combines a mechanical machining function and an electrical machining function. The two functions share hardware and software resources, in order to simplify the system and reduce cost.

Figure 2:
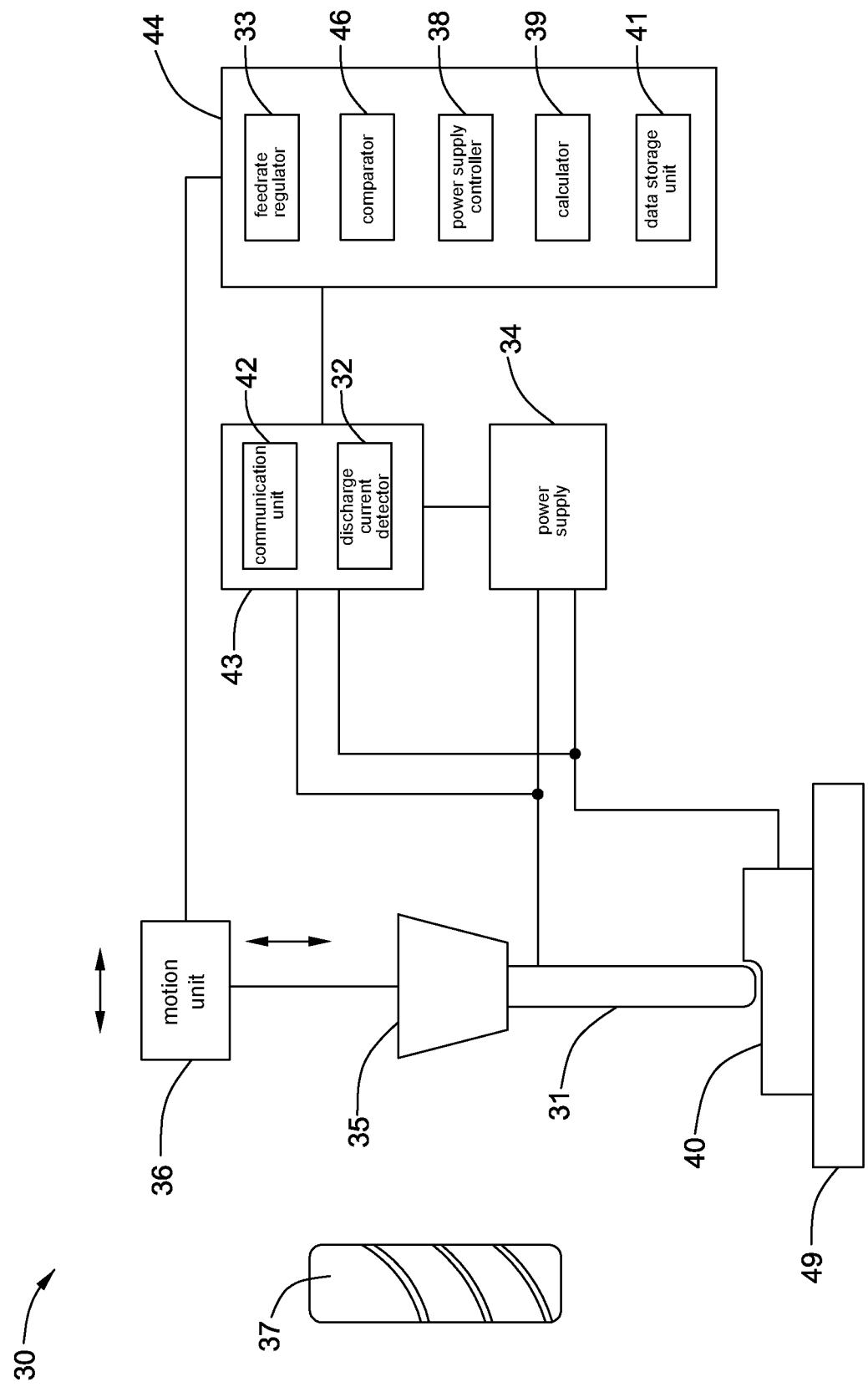
FIG. 2 is a sketch view illustrating a hybrid machining system in accordance with an exemplary embodiment of the present disclosure.

FIG. 2 shows a sketch view of a hybrid machining system 30 in accordance with an exemplary embodiment of the present disclosure. The hybrid machining system 30 is configured to machine a workpiece 40 mounted on a base 49. The hybrid machining system 30 comprises a cutter 37, an electrode 31 and a hybrid controller 44.

The hybrid machining system 30 has two working modes, i.e., a first mode and a second mode, and can be switched freely between the two modes. In the first mode, the hybrid controller 44 controls the cutter 37 to machine a workpiece 40 by a mechanical machining method, such as turning, milling and drilling. In the second mode, the hybrid controller 44 controls the electrode 31 to machine the workpiece 40 by an electrical machining method. The first mode can be used to perform a fine machining process on the workpiece which has high machining accuracy, and the second mode can be used to perform a rough machining process on the workpiece which has high machining efficiency. When the workpiece need to be machined accurately, the first mode is selected. When the workpiece need to be machined roughly, the second mode is selected. In some embodiments, a workpiece can be machined by the second mode to remove unnecessary part of the workpiece efficiently and form a rough shape, and then machined accurately by the first mode in order to increase dimensional accuracy and surface quality. The workpiece is mounted on the base during the whole machining process without any assembling or dissembling process, in such a manner that machining duration can be reduced and machining efficiency can be increased.

The hybrid machining system 30 further comprises a toolholder 35 for holding the cutter 37 in the first mode and holding the electrode 31 in the second mode, and a motion unit 36 coupled with at least one of the toolholder 35 and the workpiece 40 for positioning the toolholder 35 (as well as the cutter 37 or the electrode 31) relative to the workpiece. The hybrid controller 44 comprises a feedrate regulator 33 coupled with the motion unit 36 and configured to adjust a feedrate of the cutter 37 or the electrode 31 by controlling the motion unit 36.

The hybrid machining system 30 further comprises a power supply 34, and a discharge current detector 32. The hybrid controller 44 comprises a comparator 46. The power supply 34, the discharge current detector 32 and the comparator 46 work in the second mode. The power supply 34 is coupled with and configured to energize the electrode 31 and the workpiece 40. The discharge current detector 32 is coupled with the electrode 31 and workpiece 40 for detecting a real time discharge current passing through the electrode 31 and the workpiece 40. The comparator 46 is configured to compare the real time discharge current with a discharge current reference to obtain a compared result. The feedrate regulator 33 in the hybrid controller 44 is configured to increase or decrease the feedrate of the electrode 31 based on the compared result. The specific controlling method of the feedrate regulator 33 is similar to that of the feedrate regulator 13 as shown in the FIG. 1, which will not be repeated here.

The hybrid controller 44 may further comprise a power supply controller 38, a calculator 39, and a data storage unit 41, which are similar to the corresponding components of the electrical machining device 10 illustrated in FIG. 1 and description thereof will not be repeated here.

The hybrid machining system 30 further comprises a communication unit 42 for communicating signals among the discharge current detector 32, the hybrid controller 44 and the power supply 34. In some embodiments, the communication unit 42 may be integrated with the discharge current detector 32 as an interface circuit 43.

In general, the first mode and the second mode at least share the toolholder 35, the motion unit 36, and the feedrate regulator 33, in such a manner that hardware resources can be saved, thus simplifying circuit structure and reducing production cost.

In some embodiments, the hybrid machining system 30 is manufactured based on a mechanical machining device which comprises a cutter, a toolholder, a motion unit and a computer numerical controller (CNC). The mechanical machining device may be light duty machining device. The CNC is configured to adjust a feedrate of the toolholder (as well as the cutter) based on a given override ratio. An electrode, an interface circuit and an electrode controlling module are added to the mechanical machining device to form the hybrid machining system. Specifically, in the second mode, the interface circuit is coupled between the electrode and the CNC and configured to acquire a real time discharge current from the electrode and transmit it to the electrode controlling module. The electrode controlling module is configured to calculate an override ratio based on the real time discharge current, and provide the override ratio to the CNC. Then, the CNC adjusts the feedrate of the toolholer as well as the electrode according to the override ratio. The electrode controlling module may be integrated with the CNC. As such, the CNC is able to adjust the feedrate of the electrode based on the discharge current in the second mode, and the electrical machining method is embedded into the mechanical machining device.

Embodiments of the present disclosure also refer to an electrical machining method, which can balance machining efficiency and machining stability well.

Figure 4:
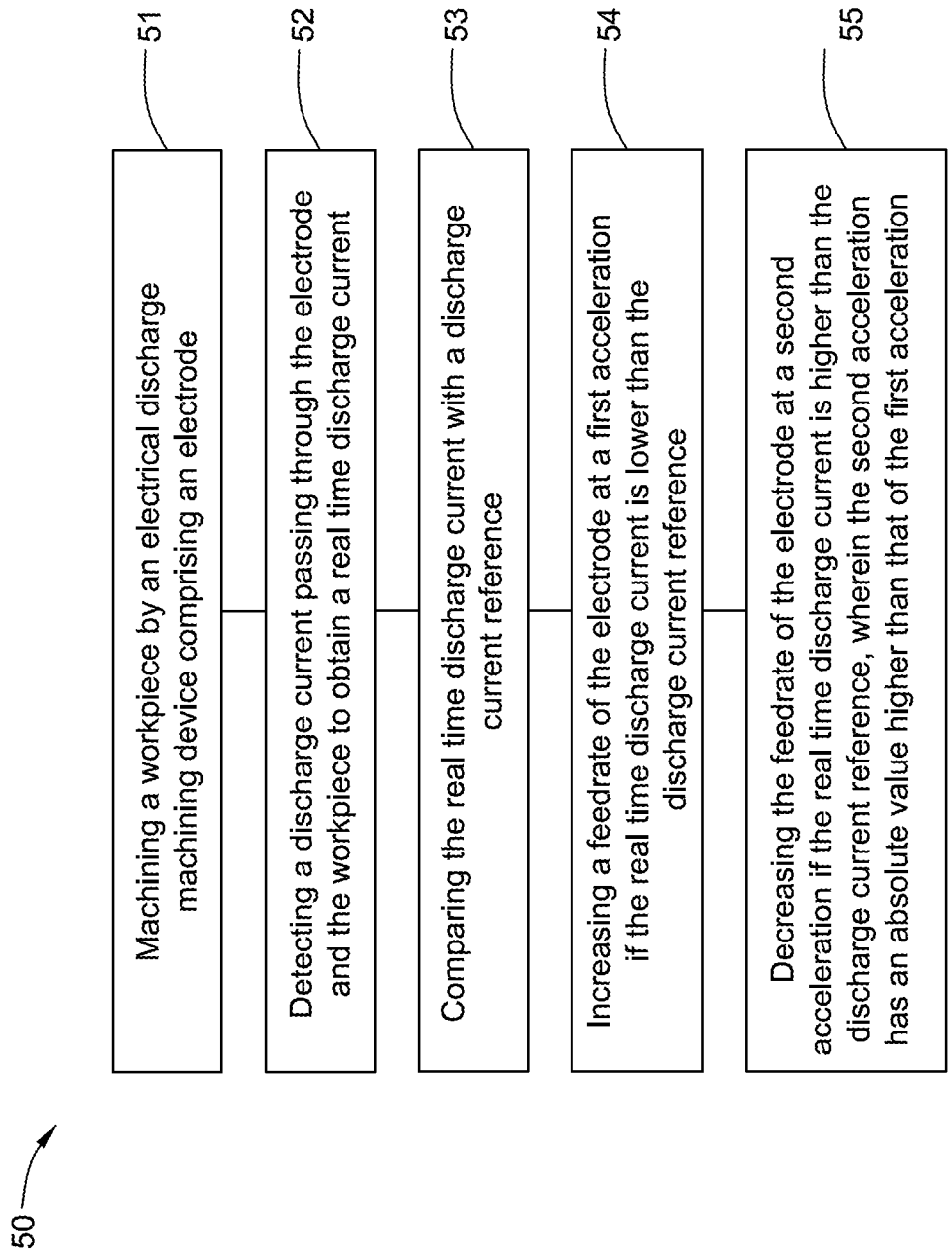
FIG. 4 is a flowchart illustrating an electrical machining method in accordance with an exemplary embodiment of the present disclosure.

FIG. 4 is a flowchart illustrating an electrical machining method 50 in accordance with an exemplary embodiment of the present disclosure. Referring to FIG. 4, the electrical machining method 50 comprises step 51-55.

In step 51, a workpiece is machined by an electrical machining device. In some embodiments, the electrical machining device is a High Speed Electro Erosion (HSEE) device performing a HSEE process on the workpiece. The electrical machining device comprises an electrode which machines the workpiece at a feedrate. The workpiece and the electrode are energized by a power supply. In some embodiments, the power supply comprises a constant voltage source.

In step 52, a discharge current passing through the electrode and the workpiece is detected to obtain a real time discharge current.

In step 53, the real time discharge current is compared with a discharge current reference to obtain a compared result. The discharge current reference may be predetermined based on an operating condition of the electrical machining process.

If the real time discharge current is lower than the discharge current reference, step 54 is performed. In step 54, the feedrate of the electrode is increased at a first acceleration. The increasing of the feedrate comprises multiplying the feedrate by a first override ratio higher than an override ratio reference. The override ratio reference may be predetermined based on the operating condition of the electrical machining process. In some embodiments, the override ratio reference is set to 100%. In this case, the first override ratio is higher than 100%. The increasing of the feedrate comprises adjusting the feedrate to a first target feedrate which is calculated by: $F_{t1}=F_r*R_1$, wherein $F_{t1}$ represents the first target feedrate, $F_r$ represents a real time feedrate, and $R_1$ represents the first override ratio.

In some embodiments, the first override ratio is calculated by $$R_1 = \frac{R_{max} - R_{ref}}{I_{min} - I_{ref}}(I_r - I_{min}) + R_{max},$$

wherein $I_r$ represents the real time discharge current, $I_{ref}$ represents the discharge current reference, $I_{min}$ represents a minimum of the discharge current, $R_{ref}$ represents the override ratio reference, and $R_{max}$ represents a maximum of the override ratio.

If the real time current is higher than the discharge current reference, step 55 is performed. In step 55, the feedrate of the electrode is decreased at a second acceleration which has an absolute value higher than that of the first acceleration.

The decreasing of the feedrate comprises multiplying the feedrate by a second override ratio lower than the override ratio reference. In some embodiments, the override ratio reference is set to 100%. In this case, the second override ratio is lower than 100%. The decreasing of the feedrate comprises adjusting the feedrate to a second target feedrate which is calculated by: $F_{t2}=F_r*R_2$, wherein $F_{t2}$ represents the second target feedrate, and $R_2$ represents the second override ratio.

In some embodiments, the second override ratio is calculated by $$R_2 = \frac{R_{min} - R_{ref}}{I_{max} - I_{ref}}(I_r - I_{max}) + R_{min},$$

$$\text{wherein } \left|\frac{R_{max} - R_{ref}}{I_{min} - I_{ref}}\right| < \left|\frac{R_{min} - R_{ref}}{I_{max} - I_{ref}}\right|,$$

$I_{max}$ represents a maximum of the discharge current, and $R_{min}$ represents a minimum of the override ratio.

In some embodiments, steps 52-55 are repeated a plurality of times after the above-mentioned step 54 or step 55, until the real time discharge current stabilizes around the discharge current reference.

The electrical machining method disclosed in the present disclosure can automatically regulate the feedrate in order to achieve a stable machining process and avoid short circuit and breakage of the electrode.

Embodiments of the present disclosure also refer to a machining method using a hybrid machining system comprising a cutter, an electrode and a toolholder, as illustrated in FIG. 2.

Figure 5:
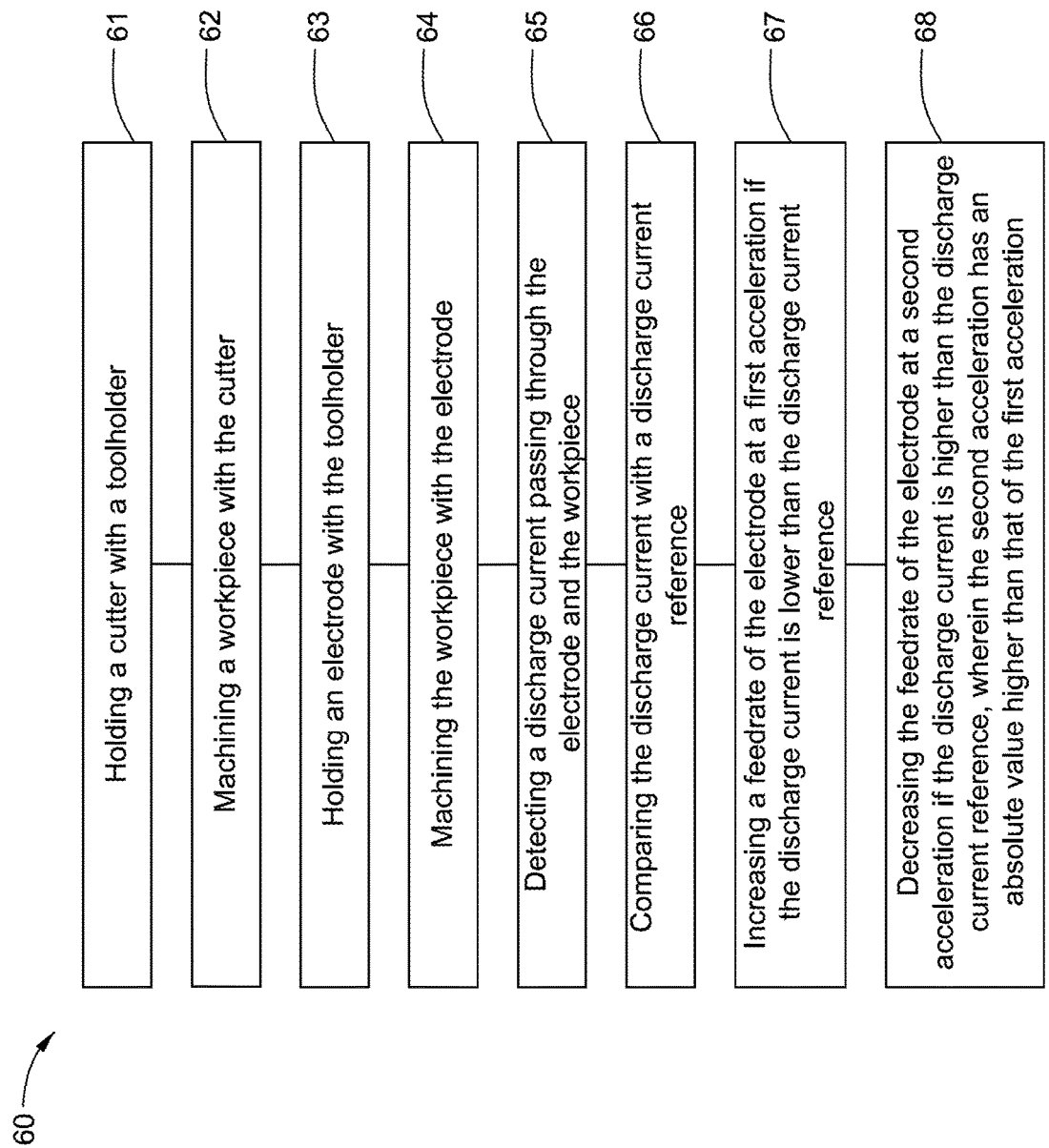
FIG. 5 is a flowchart illustrating a machining method using a hybrid machining system in accordance with an exemplary embodiment of the present disclosure.

FIG. 5 is a flowchart illustrating a machining method 60 using a hybrid machining system in accordance with an exemplary embodiment of the present disclosure. While actions of the method are illustrated as functional blocks, the order of the blocks and the separation of the actions among the various blocks shown in FIG. 5 are not intended to be limiting. For example, the blocks may be performed in a different order and an action associated with one block may be combined with one or more other blocks or may be sub-divided into a number of blocks.

Referring to FIG. 5, the method 60 comprises step 61-68, wherein steps 61-62 refer to operating the system in a first mode, i.e., a mechanical machining mode. Operating the system in the first mode comprises holding the cutter with the toolholder and machining a workpiece with the cutter, as respectively shown in step 61 and step 62.

Steps 63-68 refer to operating the system in a second mode, i.e., an electrical machining mode. In step 63, the toolholder is operated to hold the electrode. In some embodiments, the cutter is disassembled from the toolholder before the electrode is assembled with the toolholder. Then, the workpiece is machined by the electrode, as shown in step 64.

Steps 65-68 are similar to steps 52-55 illustrated in FIG. 4, which will not be repeated here.

As will be understood by those familiar with the art, the present disclosure may be embodied in other specific forms without depending from the spirit or essential characteristics thereof. Accordingly, the disclosures and descriptions herein are intended to be illustrative, but not limiting, of the scope of the disclosure which is set forth in the following claims.

The invention claimed is:

1. An electrical machining method comprising:
   machining a workpiece by an electrical machining device comprising an electrode;
   operating the electrical machine such that a discharge current is lower than a discharge current reference;
   operating the electrical machine such that the discharge current is higher than the discharge current reference;
   increasing a feedrate of the electrode towards the workpiece at a first acceleration when the discharge current passing through the electrode and the workpiece is lower than the discharge current reference; and
   decreasing the feedrate of the electrode towards the workpiece at a second acceleration when the discharge current is higher than the discharge current reference, wherein the second acceleration has an absolute value higher than that of the first acceleration.

2. The method according to claim 1, further comprising energizing the workpiece and the electrode by a constant voltage source.

3. The method according to claim 1, further comprising:
   detecting the discharge current passing through the electrode and the workpiece; and
   comparing the discharge current with the discharge current reference.

4. The method according to claim 1, wherein increasing the feedrate of the electrode comprises multiplying the feedrate by a first override ratio higher than an override ratio reference and decreasing the feedrate of the electrode comprises multiplying the feedrate by a second override ratio lower than the override ratio reference.

5. The method according to claim 4, wherein the first override ratio is calculated by $$R_1 = \frac{R_{max} - R_{ref}}{I_{min} - I_{ref}}(I_r - I_{min}) + R_{max},$$

the second override ratio is calculated by $$R_2 = \frac{R_{min} - R_{ref}}{I_{max} - I_{ref}}(I_r - I_{max}) + R_{min},$$

wherein $R_1$ represents the first override ratio, $R_2$ represents the second override ratio, $I_r$ represents a real time discharge current, $I_{ref}$ represents the discharge current reference, $I_{min}$ represents a minimum of the discharge current, $I_{max}$ represents a maximum of the discharge current, $R_{ref}$ represents the override ratio reference, $R_{min}$ represents a minimum of the override ratio, $R_{max}$, represents a maximum of the override ratio, and $$\left|\frac{R_{max} - R_{ref}}{I_{min} - I_{ref}}\right| < \left|\frac{R_{min} - R_{ref}}{I_{max} - I_{ref}}\right|.$$

6. The method according to claim 1. further comprising: calculating a first override ratio by $$R_1 = \frac{R_{max} - R_{ref}}{I_{min} - I_{ref}}(I_r - I_{min}) + R_{max};$$

wherein $R_1$ represents the first override ratio, $I_r$ represents a real time discharge current, $I_{ref}$ represents the discharge current reference, $I_{min}$ represents a minimum of the discharge current, $R_{ref}$ represents the override ratio reference, $R_{max}$ represents a maximum of the override ratio.

7. The method according to claim 6, further comprising:
calculating a second override ratio $$R_2 = \frac{R_{min} - R_{ref}}{I_{max} - I_{ref}}(I_r - I_{max}) + R_{min};$$

wherein $R_2$ represents the second override ratio, $I_{max}$ represents a maximum of the discharge current, $R_{min}$ represents a minimum of the override ratio, and $$\left|\frac{R_{max} - R_{ref}}{I_{min} - I_{ref}}\right| < \left|\frac{R_{min} - R_{ref}}{I_{max} - I_{ref}}\right|.$$

8. An electrical machining device comprising:
an electrode for machining a workpiece; and
a feedrate regulator for increasing a feedrate of the electrode towards the workpiece at a first acceleration if a discharge current passing through the electrode and the workpiece is lower than a discharge current reference, and decreasing the feedrate of the electrode towards the workpiece at a second acceleration if the discharge current is higher than the discharge current reference, wherein the second acceleration has an absolute value higher than that of the first acceleration.

9. The device according to claim 8, further comprising:
a discharge current detector coupled with the electrode and the workpiece for detecting the discharge current; and
a comparator for comparing the detected discharge current with the discharge current reference.

10. The device according to claim 8, further comprising a constant voltage source for energizing the workpiece and the electrode.

11. The device according to claim 8, further comprising:
a toolholder for holding the electrode; and
a motion unit coupled with at least one of the toolholder and the workpiece for positioning the electrode relative to the workpiece;
wherein the feedrate regulator is coupled with the motion unit and configured to increase or decrease the feedrate by controlling the motion unit.

12. The device according to claim 8, further comprising a calculator configured to:
calculate a first override ratio by $$R_1 = \frac{R_{max} - R_{ref}}{I_{min} - I_{ref}}(I_r - I_{min}) + R_{max};$$

and
calculate a second override ratio by $$R_2 = \frac{R_{min} - R_{ref}}{I_{max} - I_{ref}}(I_r - I_{max}) + R_{min};$$

wherein $R_1$ represents the first override ratio, $R_2$ represents the second override ratio, $I_r$ represents a real time discharge current, $I_{ref}$ represents the discharge current reference, $I_{min}$ represents a minimum of the discharge current, $I_{max}$ represents a maximum of the discharge current, $R_{ref}$ represents the override ratio reference, $R_{min}$ represents a minimum of the override ratio, $R_{max}$ represents a maximum of the override ratio, and $$\left|\frac{R_{max} - R_{ref}}{I_{min} - I_{ref}}\right| < \left|\frac{R_{min} - R_{ref}}{I_{max} - I_{ref}}\right|.$$

13. The device according to claim 12, wherein increasing the feedrate of the electrode comprises multiplying the feedrate by the first override ratio higher than the override ratio reference; and
wherein decreasing the feedrate of the electrode comprises multiplying the federate by the second override ratio lower than the override ratio reference.

14. A hybrid machining system, comprising:
a cutter for machining a workpiece in a first mode;
an electrode for machining the workpiece in a second mode; and
a hybrid controller for controlling the cutter to machine the workpiece in the first mode, increasing a feedrate of the electrode towards the workpiece at a first acceleration in the second mode if a discharge current passing through the electrode and the workpiece is lower than a discharge current reference, and decreasing the feedrate of the electrode towards the workpiece at a second acceleration in the second mode if the discharge current is higher than the discharge current reference, wherein the second acceleration has an absolute value higher than that of the first acceleration.

15. The system according to claim 14, further comprising:
a toolholder for holding the cutter in the first mode and holding the electrode in the second mode; and
a motion unit coupled with at least one of the toolholder and the workpiece for positioning the toolholder relative to the workpiece;
wherein the hybrid controller is coupled with the motion unit and configured to increase or decrease the feedrate by controlling the motion unit.

16. The system according to claim 14, further comprising a calculator configured to:
calculate a first override ratio by $$R_1 = \frac{R_{max} - R_{ref}}{I_{min} - I_{ref}}(I_r - I_{min}) + R_{max};$$

and
calculate a second override ratio by $$R_2 = \frac{R_{min} - R_{ref}}{I_{max} - I_{ref}}(I_r - I_{max}) + R_{min};$$

wherein $R_1$ represents the first override ratio, $R_2$ represents the second override ratio, $I_r$ represents a real time discharge current, $I_{ref}$ represents the discharge current reference, $I_{min}$ represents a minimum of the discharge current, $I_{max}$ represents a maximum of the discharge current, $R_{ref}$ represents the override ratio reference, $R_{min}$ represents a minimum of the override ratio, $R_{max}$ represents a maximum of the override ratio, and $$\left|\frac{R_{max} - R_{ref}}{I_{min} - I_{ref}}\right| < \left|\frac{R_{min} - R_{ref}}{I_{max} - I_{ref}}\right|.$$

17. The device according to claim 16, wherein increasing the feedrate of the electrode comprises multiplying the feedrate by the first override ratio higher than the override ratio reference; and
    wherein decreasing the feedrate of the electrode comprises multiplying the federate by the second override ratio lower than the override ratio reference.

18. A machining method using a hybrid machining system comprising a cutter, an electrode and a toolholder, the method comprising:
    operating the system in a first mode comprising: holding the cutter with the toolholder, and machining a workpiece with the cutter; and
    operating the system in a second mode comprising: holding the electrode with the toolholder, machining the workpiece with the electrode,
    operating the system such that a discharge current is lower than a discharge current reference; and
    operating the system such that the discharge current is higher than the discharge current reference;
    increasing a feedrate of the electrode towards the workpiece at a first acceleration when the discharge current passing through the electrode and the workpiece is lower than the discharge current reference, and
    decreasing the feedrate of the electrode towards the workpiece at a second acceleration when the discharge current is higher than the discharge current reference, wherein the second acceleration has an absolute value higher than that of the first acceleration.

19. The method according to claim 18, further comprising:
    calculating a first override ratio by $$R_1 = \frac{R_{max} - R_{ref}}{I_{min} - I_{ref}}(I_r - I_{min}) + R_{max};$$

and
    calculating a second override ratio by $$R_2 = \frac{R_{min} - R_{ref}}{I_{max} - I_{ref}}(I_r - I_{max}) + R_{min};$$

wherein $R_1$ represents the first override ratio, $R_2$ represents the second override ratio, $I_r$ represents a real time discharge current, $I_{ref}$ represents the discharge current reference, $I_{min}$ represents a minimum of the discharge current, $I_{max}$ represents a maximum of the discharge current, $R_{ref}$ represents the override ratio reference, $R_{min}$ represents a minimum of the override ratio, $R_{max}$ represents a maximum of the override ratio, and $$\left|\frac{R_{max} - R_{ref}}{I_{min} - I_{ref}}\right| < \left|\frac{R_{min} - R_{ref}}{I_{max} - I_{ref}}\right|.$$

20. The method according to claim 19, wherein increasing the feedrate of the electrode comprises multiplying the feedrate by the first override ratio higher than the override ratio reference; and
    wherein decreasing the feedrate of the electrode comprises multiplying the federate by the second override ratio lower than the override ratio reference.

\* \* \* \* \*